S. W. ADAMS.
Seed-Planter.
No. 30,861.
Patented Dec. 11, 1860.
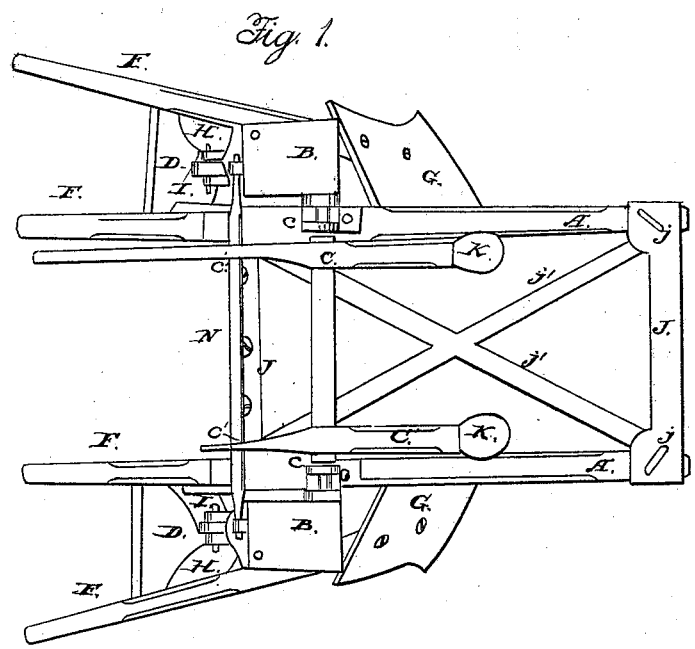
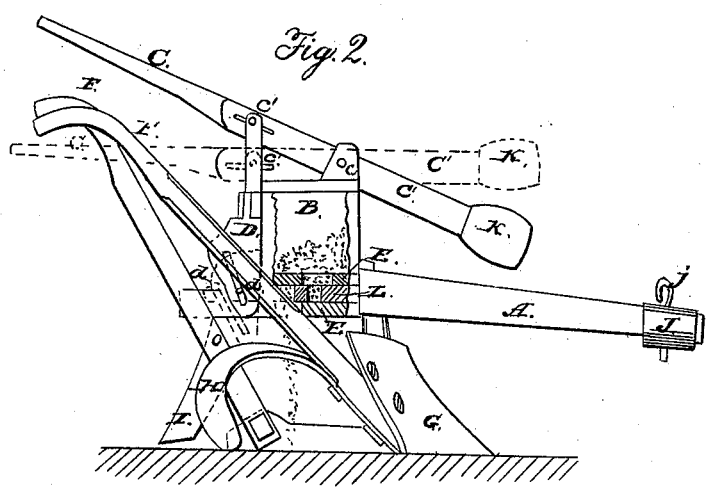
Witnesses.
James M. Lue
Jesse Adams
Inventor:
Samuel W. Adams

UNITED STATES PATENT OFFICE.

SAMUEL W. ADAMS, OF MOULTRIE COUNTY, ILLINOIS.

IMPROVEMENT IN CORN-PLANTERS.

Specification forming part of Letters Patent No. 30,861, dated December 11, 1860.

*To all whom it may concern:*

Be it known that I, SAMUEL W. ADAMS, of Moultrie county, and State of Illinois, (post-office address Mattoon, Illinois,) have invented a new and useful Improvement in Corn-Planters; and I do hereby declare the following to be a full, clear, and exact description of the same, reference being had to the accompanying drawings, making part of this specification, in which—

Figure 1 is a plan view, and Fig. 2 a side elevation, of the corn-planter, being sectioned through the seed-box to show the operation of its several parts.

A is the frame of the machine; B B, the seed-boxes; C C, the handles or levers, hinged at c and slotted to allow the pin c to slide up and down in the lever when the slide L is to be pushed forward or backward through the agency of the slot in the wedged-shaped lever D, as shown. L is the feeding-slide, running between two plates E and E'. F and F are the handles of the plows; G, the plowshare; H, the shovel, which, in combination with the knife I, covers up the furrow after the corn has been dropped therein. J J are bands of iron, which, in combination with pins $j\ j$ and braces $j'\ j'$, as shown in Fig. 1, hold the two plows firmly together. K K are weights to keep the slide in position, as shown.

The operation is as follows: Two plows are placed side by side, each having had the hoppers, &c., previously attached. The bands J J and braces $j'\ j'$ are then put on, and the braces pinned, as shown at $j\ j$. The levers C C are then hinged, as at c, and the rod N, which actuates lever D, attached to said levers C C, as shown, and the machine is ready for operation. The hoppers or seed-boxes B B are filled with corn or other seed to be planted, and the horses started. When the driver or operator wishes to drop the seed he will depress the lever C into position shown in red lines, Fig. 2, which pushes down the lever D, which will (by reason of the inclined slot $d$, in which a pin, $d'$, fastened to the slide L, works) pull out the slide L into the position shown in red lines, Fig. 2. The slide L by coming forward closes the aperture in the upper plate, E, and brings the corn in the hole in the slide over the aperture in the lower part, E', when it will drop down into the furrow (see red lines) and be covered up by shovel H and knife I, as shown. The driver then lets go of the lever C, which, by reason of the weight K, falls and the parts resume their positions.

What I claim as my invention, and desire to secure by Letters Patent, is—

The combination and arrangement, as described, of two plows with the slide L, seed-boxes B B, levers C C and D, shovel H, and knife I, substantially as and for the purposes herein described.

SAMUEL W. ADAMS.

Witnesses:
GREENVILLE M. MITCHELL,
JOHN CUNNINGHAM.